United States Patent [19]
Gargrave et al.

[11] 3,908,500
[45] Sept. 30, 1975

[54] APPARATUS FOR MOUNTING A TOOL HOLDER OR LIKE ASSEMBLY TO A BACKING STRUCTURE

[75] Inventors: Robert J. Gargrave; Ludomil A. Holiga, both of Dayton, Ohio

[73] Assignee: Dayton Progress Corporation, Dayton, Ohio

[22] Filed: Aug. 21, 1974

[21] Appl. No.: 499,268

Related U.S. Application Data

[62] Division of Ser. No. 313,163, Dec. 7, 1972, Pat. No. 3,848,494.

[52] U.S. Cl. .................... 83/700; 83/109; 83/563; 83/698; 100/18; 206/46
[51] Int. Cl. .............................................. B26d 7/26
[58] Field of Search ....... 83/13, 109, 102, 104, 560, 83/563, 700, 701, 698, 699; 76/107 R, 107 C; 100/18; 29/465; 206/46

[56] References Cited
UNITED STATES PATENTS

| | | | |
|---|---|---|---|
| 1,801,490 | 4/1931 | Falstrom | 83/698 |
| 2,504,642 | 4/1950 | Burgess | 83/13 |
| 3,281,343 | 10/1966 | O'Connor | 76/107 R |
| 3,296,905 | 1/1967 | Killaly | 83/698 X |
| 3,327,575 | 6/1967 | Duffee et al. | 29/465 X |
| 3,495,495 | 2/1970 | Berry | 83/698 X |
| 3,554,060 | 1/1971 | Gargrave et al. | 29/465 X |

*Primary Examiner*—Donald R. Schran
*Assistant Examiner*—W. D. Bray
*Attorney, Agent, or Firm*—Jerome P. Bloom

[57] ABSTRACT

Apparatus for simple and precise positioning of a tool holder or like assembly on a backing structure, characterized by the tool holder and its backing structure having interfitting parts which interconnect by a sliding motion of one relative to the other. The interfitting parts include portions which provide, on contact, a precise datum control point, for location of said assembly, and other portions formed to accommodate discrepancies in the prescribed positions thereof relative said datum control point. The interfitting parts are so designed to enable a simple and automatic positioning of a tool holder or like assembly on a base support by a slip fit of one to the other.

11 Claims, 12 Drawing Figures

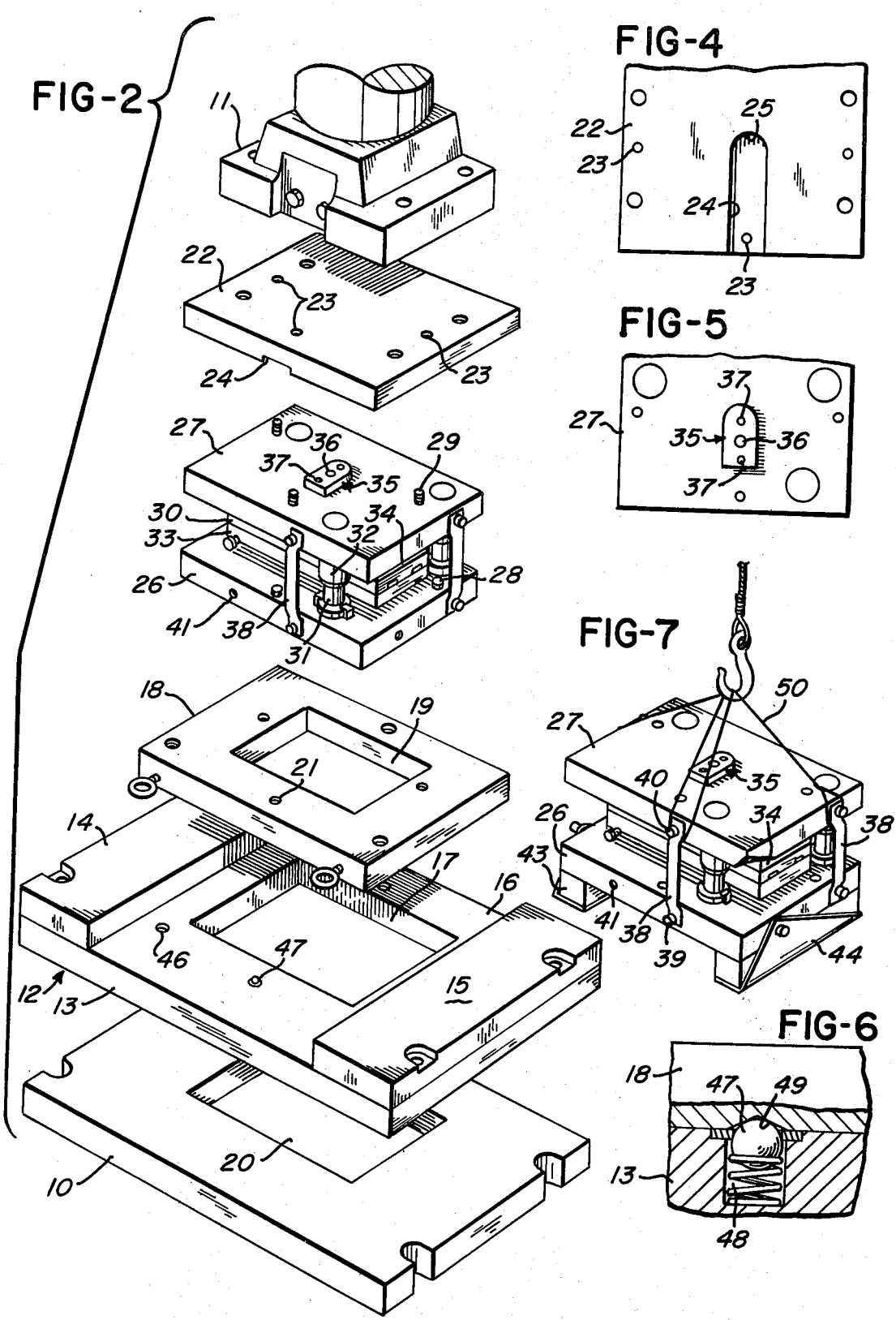

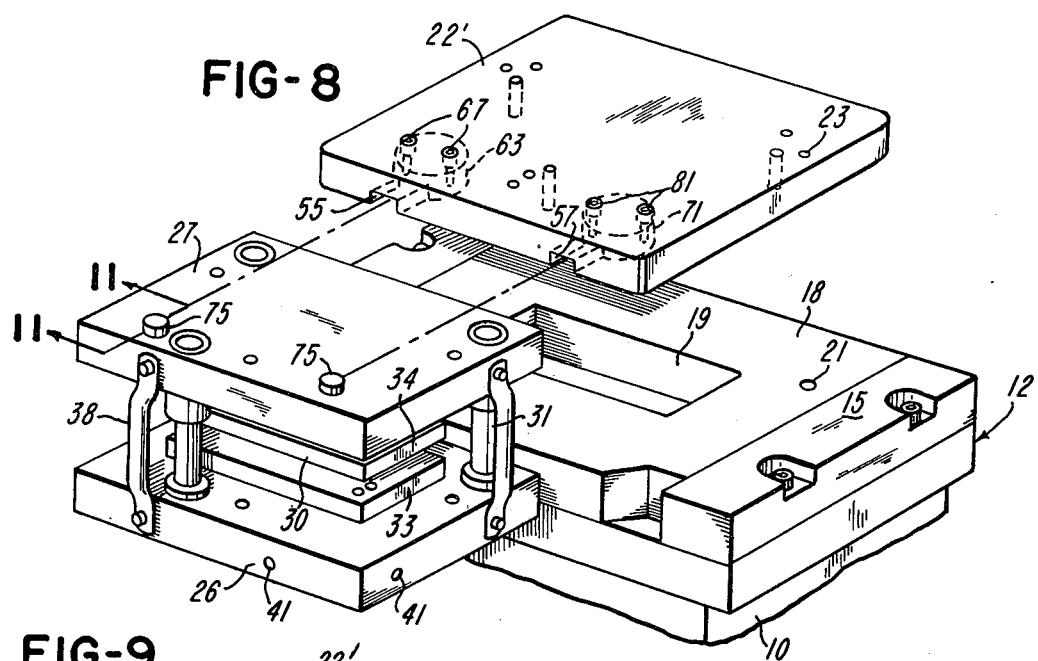
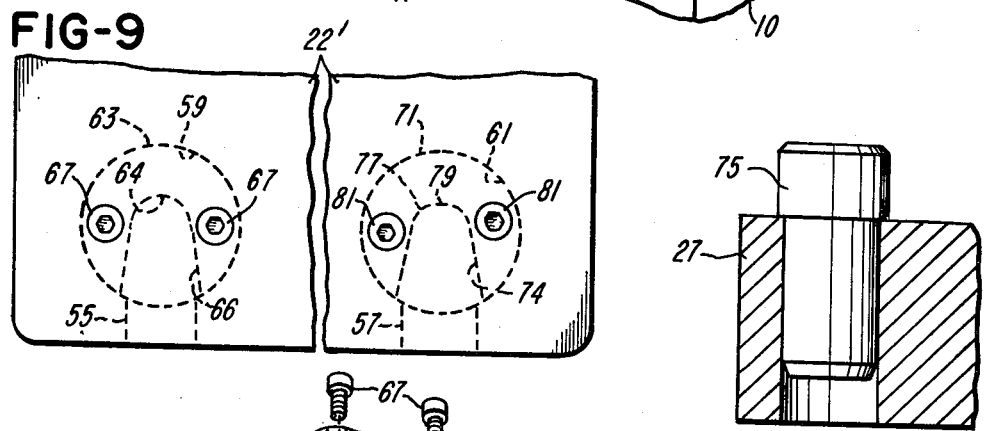
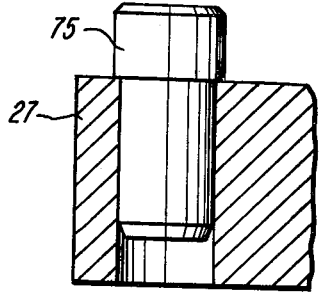
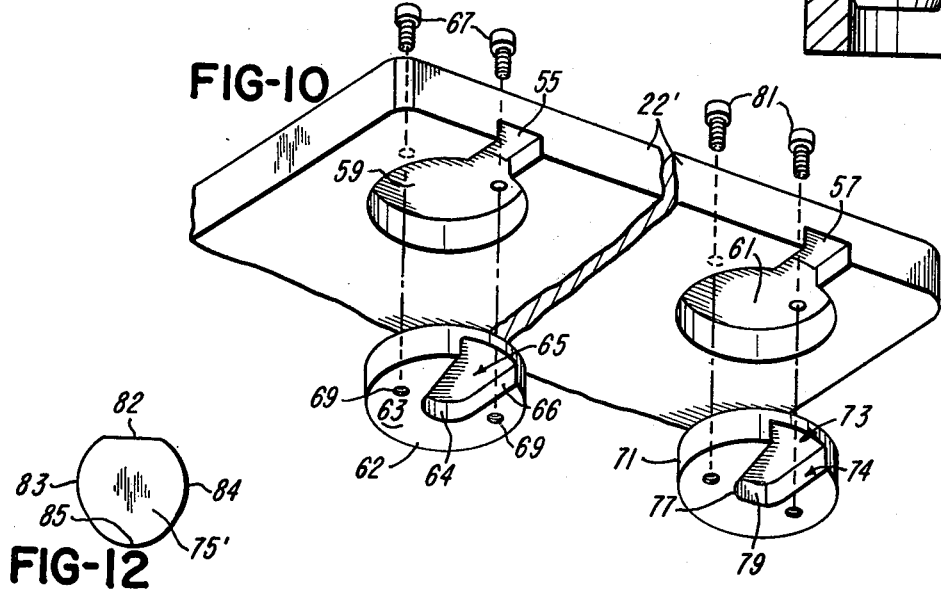
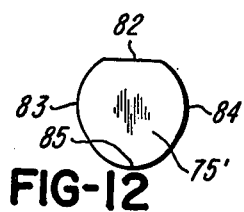

APPARATUS FOR MOUNTING A TOOL HOLDER OR LIKE ASSEMBLY TO A BACKING STRUCTURE

This application is a division of U.S. patent application Ser. No. 313,163 filed Dec. 7, 1972, now Pat. No. 3,848,494 for "PRESS ADAPTER SYSTEM FOR STANDARDIZING DIE USE".

BACKGROUND OF THE INVENTION

This invention relates to means facilitating the mount of a tool holder or like assembly to a backing structure. It has a particularly advantageous application to press systems and will be so described, but only for purposes of illustration. It will be obvious that the application of the invention is not so limited and such is not intended. As applied to press systems, it enables a die constructed and adapted for one forming, punching or like operation to be readily substituted in a press for another die constructed and adapted for another operation.

As used herein, the term "die" designates a die assembly tooled up to produce a specific part, in a stamping or like operation.

The changeover of a press to equip it to perform different forming, punching or like operations is usually a tedious and time-consuming procedure. In some instances heavy bolster elements must be applied to a press bed in order to mount a lower or fixed half a die while the press ram or slide must be modified or provided with means adapting it to accept the upper or acting half of the die. Further, the application of the upper of the die halves has not been easy since devices to positively position the die halves in the press center line either have not heretofore existed or have been such as to be incapable of controlling relative angular turning movements of a die part, as is often required. It is for reasons such as this that heretofore each die has been custom built, along with bolsters and other adapter elements by which it is to be fitted to a press. It is obvious therefore that the installation of a new die or the interchange, in a press, of a die to change its operation and application has been a major undertaking, It is also obvious that unless the die parts are carefully formed within tolerances and applied with care, workpieces produced in the use thereof are often damaged and malformed.

In solving the problems indicated to exist in the prior art, the present invention utilizes a concept of standardizing dies and their application, according to which similarly constructed but different preassembled dies can be quickly and easily substituted in a press. Such has been unknown in the prior art.

SUMMARY OF THE INVENTION

The present invention has in view use of a "standard" die, that is a die which lends itself to varied tooling while retaining basic structural characteristics. Die classes and die groups of varying complexity, according to the requirements of the work, are established and appropriate selection made to utilize pre-made standard die components in a standard size of die. These are installed and substituted as required in a press. According to a feature of the invention "Pressizer" elements mount as adapters to the press with a broad common application to groups and classes of die sets, such application being extended by an easily replaceable platen of special reference to certain series of dies. A feature of the invention is a means of slip fitting the platen to a common bolster, the slip fit motion being used substantially automatically to locate the platen and to fix it in a condition of parallelism with opposing support elements.

One such opposing support element is another adapter element in the form of a thrust plate mounted to the press ram or slide and universal with respect to each of the variously substituted dies. According to a further feature of the invention the thrust plate and a cooperating element of each die have interfitting portions which locate the die properly in the press, insure parallelism thereof and obviate undesired relative angular turning movements. In the illustrative embodiments of the invention the interfitting portions in the preferred embodiment include provision for a specially designed pin-socket arrangement for interrelating the die set to the thrust plate. the interfitting portions may also advantageously include a centerizing plate on the die set, positionable thereon either in accordance with the geometric center or the dynamic load center for certain applications.

Invention embodiments are so structured as to preclude bending movement of dies during load application, as is specifically apparent where dies of varying heights are mounted on rails to adjust for press opening.

In a broad sense the invention provides an ability to standardize and control the sizes of all elements within the press mounting apparatus and the working dies whereby to eliminate confusion of assembly and reduce the scope of inventory and maintenance procedures.

A primary object of the invention is to provide means for quick interchange of tool holders on a backing structure which renders such devices more economical to employ, more efficient and satisfactory in use, adaptable to a wide variety of application and unlikely to malfunction.

A further object of the invention is to provide a system in accordance with which a press is adapted for a quick and accurate setup and interchange of dies and particularly the tool holder portion of the dies therein.

Another object of the invention is to provide for an accurate, quick, firm positioning of a die by structure featuring a special universal pin-socket arrangement for interrelating dies to a thrust or like plate.

Another object of the invention is to provide for accurate positioning of a die in accordance with which a die holder is positively located on the press centerline or in conformance with the dynamic loading of the die set and is prevented from angular misalignment in the application thereof.

An additional object of the invention is to provide apparatus for simple and precise positioning of a tool holder or like plate assembly relative to a backing structure characterized by interfitting means on said plate assembly and its backing structure including portions which provide, on a slip fit contact, a precise datum control point, for location of said assembly, and other portions formed to accommodate discrepancies in the prescribed positions thereof relative said datum control point, within prescribed tolerances, so as to provide for a simple and automatic location of said plate assembly on its backing structure on a slip fit one to the other.

An additional object of the invention is to provide an adapter system for mounting a tool holder or like assembly to a backing structure possessing the advantageous structural features, the inherent meritorious characteristics and the means and mode of use herein described.

With the above and other incidental objects in view as will more fully appear in the specification, the invention intended to be protected by Letters Patent consists of the system, the parts and extensions thereof and the mode of their application is hereinafter described or illustrated in the accompanying drawings, or their equivalents.

Referring to the drawings wherein are shown some but not necessarily the only forms of embodiment of the invention, FIG. 1 is a perspective view, in fragmentary form, of a press equipped with an embodiment of the present invention;

FIG. 2 is an exploded perspective view of the press and the components embodied therein;

FIG. 4 is a fragmentary view of the underside of the thrust plate embodied in the showing in FIG. 1 showing the "Centerizer" slot therein;

FIG. 5 is a view of a fragment of a punch holder element of the invention, showing the "Centerizer" plate thereon;

FIG. 6 is a fragmentary sectional view of detent means provided for the platen embodied in the invention structure here illustrated;

FIG. 7 is a view of the die embodied in the structure of FIGS. 1 and 2, shown suspended in a sling and to include handlers thereon in a position to lock the die and to define anchors for the sling;

FIG. 8 is a view illustrating a preferred embodiment of the invention as provided by a modification of the structure shown in FIGS. 1–7;

FIG. 9 is a fragmentary plan view illustrating details of the thrust plate of FIG. 8;

FIG. 10 is a perspective view of the bottom of the thrust plate shown in FIG. 8, together with related structure;

FIG. 11 is a fragmentary sectional view of a portion of the punch holder embodied in FIG. 8; and FIG. 12 shows a modification of the invention as embodied in FIGS. 8–11.

DESCRIPTION OF A PREFERRED EMBODIMENT OF THE INVENTION

Figure 1:
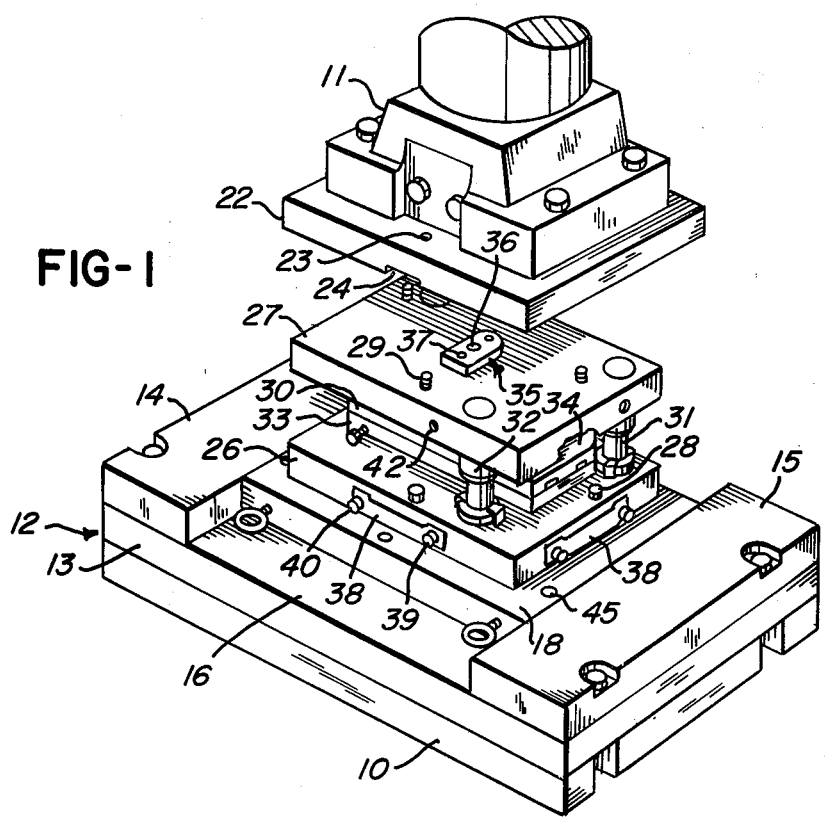
Figure 3:
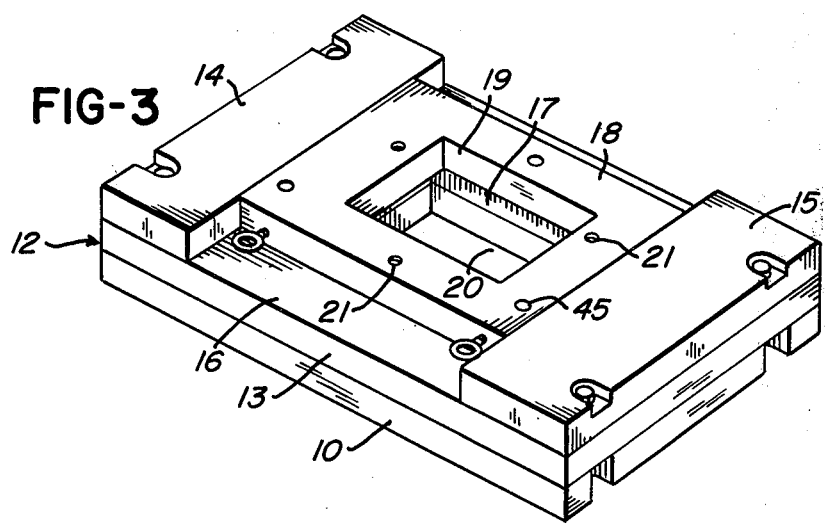
FIG. 3 is a perspective view, showing a fragment of the bed portion of the press including the bolster and platen elements thereon.

Referring to the drawings, a punch press comprises a stationary bed 10, and, in opposing relation to the bed, a slide or ram member 11 reciprocable through approaching and retracting strokes toward and away from the bed. In equipping a press for work there is interposed between the press slide and the press bed a die comprised of acting and fixed die halves suitably structured to perform punching, cutting, forming and like operations upon work material fed across the fixed die half. In addition to the die, however, it is conventionally required that bolsters and other adapter devices be mounted to either or both the press slide and the press bed, in an effort to provide mountings for the fixed and acting halves of the die, absorb wear, complement the die in achieving correct extents of opening and closing movements and provide a selected clear area for drop-through of cut slugs. The latter feature is of importance in that it is desirable to provide the largest possible amount of reaction area on the press bed while still retaining adequate clear area for drop-through of cut materials.

According to the prior art, the equipping of a press to stamp a particular work piece, and the changeover of a press to stamping some other work piece, is a relatively expensive and time consuming operation. There is, as a result, a tendency to avoid wasting time and expense by using makeshift, jerry-built assemblies resulting often in damage or costly misoperation.

The present invention provides a "Pressizer" by which basic press apparatus is adapted to materially improve the speed and facility with which a press can be equipped for stamping one work piece and changed over to stamping an entirely different work piece by simply changing the die. A bolster 12 constitutes one adapter element of the "Pressizer" and includes a base plate 13 bolted in place on the press bed 10. At its ends, the base plate 13 has raised parallel shoulders 14 and 15 defining an intermediate recessed area 16 the base of which is the upper surface portion of plate 13 bounded by the means defining the shoulders 14 and 15. The plate 13 has a central opening 17, between and spaced from the shoulders 14 and 15 which is arranged to overlie and position in alignment with a cavity 20 in the press bed 10.

The base of the recess 16, together with the shoulders 14 and 15 form an effective slideway for slip fit therein of a platen 18. The latter is appropriately positioned to align a central opening 19 therein with the base plate opening 17 and it is then suitably and releasably anchored in position between the means defining the shoulders 14 and 15. Together the bolster 12 and platen 18 form a bolster plate assembly having considerable advantage. It will be understood in this connection that various slip fit platens 18 having different clear areas for openings for drop-through may be substituted in a single bolster, where such is desired. In any case, the platen 18 has a pattern of tapped attachment holes 21 by which the fixed half of the die set is installed thereon, as will be seen. Thus, different platens 18 may be substituted to agree with particular dies. By means of the simple slip fit platen 18 of required depth, the bolster plate assembly may be given a height to mount a die set in a position whereby a uniform stroke of the press slide 11 may be utilized for proper opening and closing movements of the die. The entire construction of the "Pressizer" bolster 12 is such that its use is very economical and eliminates the problem of wear usually encountered due to frequent interchange of dies.

Further comprised in the adapter elements forming the invention "Pressizer" is a thrust plate 22 bolted to the underside of the press slide to dispose in an opposed, parallel relation to the platen 18. The thrust plate has a pattern of tapped attachment holes 23 by which the acting half of the die is secured thereto, as will be seen. The under surface of the thrust plate, or that surface facing platen 18, is planar and cut by a slot or recess 24 which at its one end opens through what may be considered a front edge of the thrust plate, and thus laterally, at a location centered between the ends of the plate. The plate wall surfaces which form the sides of this recess are parallel. At its other end the recess 24 extends to the mid point of the thrust plate, such other or inner end being defined by an arcuate wall surface providing a seat 25. The radial center from which curved seat 25 is described coincides with the point of intersection of imaginary center lines taken from side to side and from front to back of the thrust plate. The arcuate wall surface providing the seat 25 at the inner end of the horizontal orienting recess, slot or groove 24 has a centering and control function as will be more particularly described.

Platens 18 having varying patterns of attachment holes 21 may be substituted in the press as may be found desirable to adapt to use of particular die or series of dies.

The platen 18 and the thrust plate 22 form the jaws of the press between which a die is installed to perform the actual cutting, punching or like operations upon an inter-vening work piece as the press jaws are alternately opened and closed.

Dies of known construction may be used in conjunction with the "Pressizer" adapter elements, for example a die as shown in Gargrave et al., U.S. Pat. No. 3,554,060 issued Jan. 12, 1971. A die similar to that shown in the patent is illustrated in the instant press, with reference being made to the patent for a disclosure of structural details not here specifically dealt with. The illustrated die includes a die holder 26 and a punch holder 27. The die holder 26 seats flushly upon the platen 18 and includes drop-through openings (not shown) which overlie the opening 19 in the platen 18. Properly oriented on the platen 18, the die holder 26 has attachment holes which align with the holes of the pattern 21 in the platen to commonly receive screws 28 by means of which the die holder is secured to the platen. The punch holder 27 mounts to the under side of thrust plate 22 and receives therethrough screws 29 which are applied to the pattern of attachment holes 23 in the thrust plate. A series of guide posts 31 is set in the die holder 26 to project upwardly thereof and guide bushings 32 dependent from the punch holder 27 receive the guide posts with a sliding fit. The guide posts and guide post bushings interact to guide the die holder and punch holder in relative approaching and separating movements which take place in conjunction with and as a result of reciprocation of the press slide 11. Superimposed on the die holder 26 is a die plate 33 containing various recesses and through openings with which tool elements cooperate in the cutting, punching or forming of a work piece. The through openings provide for initial drop-through of slugs and cut material which are allowed to continue on through communicating drop-through opening including the opening 19 in the platen 18. The die plate 33 is precision mounted to the die holder 26 and positioned in place by screws and dowels.

The punch holder 27 has secured to what may be considered the under or lower side thereof a punch plate 34. It is likewise precision oriented on the punch holder and is fixed in place by appropriately applied screws and dowels. The punch plate aligns with the die plate and mounts tool elements complementary to the recesses and openings in the die plate. The tools on the punch plate and the recesses and die openings in the die plate are located within the die space, in the areas thereof between the guide posts and establish the space available for mounting of punch and die elements and other tooling required in the press. The die space so provided defines the nominal size of a die set.

The punch holder 27 and punch plate 34 form principal elements of the acting half of the die. Die holder 26 and die plate 33 form principal elements of the fixed half of the die. In the operation of the press a work piece is fed between the acting and fixed die halves so that when the press jaws close thereon complementary portions on the punch-plate assembly and on the die plate assembly effect appropriate punching, cutting, forming and like operations. The operation of the press normally is cycled or continuous, with repeated closing and opening movements of the press jaws being effected as work pieces or a continuous work strip is fed into and out of position between the acting and fixed halves of the die.

As disclosed in the above identified patent, a die many include a stripper plate 30 interposing between the punch plate and the die plate and suspended from the punch plate with freedom of relative bodily motion. Tool elements on the punch plate extend toward the die plate through openings in the stripper plate, which is urged outwardly or away from the punch plate by appropriate resilient means. The stripper plate holds the work piece to the die plate and prevents its retracting away from the die plate when an opening movement of the press jaws draws the tool elements out of or away from the work.

Dies are installed in and substituted in the press in a relatively simple manner by virtue of the adapter elements of the "Pressizer", which elements constitute basic structural portions provided by the present invention. Also, assisting in the simplified installation and substitution, as well as performing new and important functions in the mounting of the die, per one embodiment of the invention, is a "Centerizer" plate 35 fastened to the outer or upwardly facing surface of the punch holder 27. The plate 35 is configured substantially in correspondence with the configuration of thrust plate recess 24. At least one end thereof is rounded to conform to arcuate seat 25 and the plate is oriented on the punch holder to cause the rounded end to face inward or toward the seat 25. As received in the recess 24 with a slip and sliding fit, "Centerizer" plate 35 positively precludes both side to side and rotary turning movements of the punch holder and punch plate of the die set relative to the thrust plate 22. It is to be understood in this connection, that although the punch holder 27 has been described as being screwed or bolted to the thrust plate, a press operation embodying the same any produce relatively powerful torsional and like forces attempting to misalign the acting die half. The "Centerizer" plate resists this and serves also a useful function in facilitating and maintaining an accurate positioning of the punch holder relative to the thrust plate for installation of attachment connectors.

The "Centerizer" plate may be considered to be mounted on the front to back center line of the punch holder with the radial center of its rounded end coinciding with the point of intersection of imaginary center lines drawn from side to side and from front to back of the punch holder. It may, however, be otherwise positioned if it is desirable to locate the "Centerizer" plate with respect to the dynamic load center of the die set rather than with respect to the geometric center. A screw 36 and dowel pins 37 secure the "Centerizer" plate to and in position on the punch holder.

A press user, having his press equipped with "Pressizer" elements places a preassembled die on the platen 18, locating it in an approximately correct position thereon. The press slide 11 is then lowered until thrust plate 22 approaches contact with the punch holder 27.

The die set is then finely maneuvered until the "Centerizer" plate 35 thereon is in position to engage in thrust plate recess 24. Further lowering of the slide brings the thrust plate 22 into contact with the punch holder and causes the "Centerizer" plate 35 to enter recess 24. Edges of the "Centerizer" plate may be chamfered to facilitate entrance of the plate into the thrust plate slot or recess. In the process, the die is moved into a positive position of alignment with the thrust plate. The die is then pushed toward the back of the press, to seat the rounded end of the "Centerizer" plate against the wall surface defined by the arcuate configuration of the seat 25. As a consequence of these adjustments, the die is positively locked against lateral motion and against rotary motion relative to the thrust plate. Attachment screws or bolts are then installed, connecting the die holder 26 to the platen 18 and connecting the punch holder 27 to the thrust plate 22. In the assembly process the "Centerizer" plate aligns the die correctly in a side to side direction or on what may be termed the X—X axis, aligns the die correctly in a front to back sense, along what may be termed the Y—Y axis (the attachment of connectors in the pattern of holes 23 completing this function), aligns the die correctly in a radial or rotary sense and positions the die in the press for correct continuing feed of the work piece or stock material.

The "Centerizer" plate 35 constitutes one modification of a known die contemplated in embodiment of the present invention. This has proven to function as above described and to provide considerable advantage in use. However, the preferred and more universally applicable alternative to the use of the plate 35 and the recess 24 is illustrated in FIGS. 8 through 11 of the drawings, and provides structure constituting a preferred embodiment of the invention which forms the subject of the claims in the present application. In this case the thrust plate, here identified as 22', is modified to eliminate the recess 24. In lieu thereof, the plate 22' is provided in its bottom surface with transversely spaced key-ways or channels 55 and 57 the sides of which are parallel and the outer ends of which open in a sense laterally from the plate 22'.

The channels 55 and 57 are respectively located adjacent and spaced inwardly of the respective lateral extremities of the plate 22'. They extend in a sense perpendicular to and open at one end, constituting their outer ends, from the front edge of the plate. At their innermost ends, the channels 55 and 57 are respectively extended by an enlargement defined by a circular recess in the bottom of the plate, the depth of which recess is greater than that of the related channel. The recess at the innermost end of channel 55 is identified in the drawings by the numerals 59 while the recess at the innermost end of channel 57 is identified by the numeral 61.

The recess 59 receives a disc shaped insert 63 the lowermost or outer surface portion 62 of which positions flush with the bottom surface of plate 22'. The disc 63 is cut by a wedge-like notch 65 which opens from its bottom surface 62 and a portion of its peripheral edge. The depth of the notch 65 is such that its base positions co-planar with the base of the channel 55 on the insertion of the disc in the recess 59. The wall which defines the periphery of the notch 65 has an innermost central portion 64 formed as a uniform arc, the circumferential extent of which is slightly less than 180° and the center of radius of which is coincident with the center of the disc 63, and thereby coincident with the center of the recess 59. The side walls 66 of the notch 65 are divergent from and extend tangentially to the lateral extremities of the arcuate wall portion 64. An entrance to the notch 65 is thus defined which is relatively enlarged and wider than the opening from the inner end of the related channel 55. On insertion in the plate 22', the disc 63 is fixed in a position to center the mouth of the notch 65 in reference to the channel or key-way 55 and to provide an extension thereof at its inner end. Once positioned, disc 63 is secured in place within recess 59 by socket head screws 67 applied thereto through suitable openings in the top portion of the thrust plate 22', to threadedly engage in holes 69 tapped in the base or seating portion of the disc. The holes 69 are so positioned as to fall on a diametral line of the disc including its center, which line is parallel to the front edge of the plate 22'.

The recess 61 is filled by a somewhat similar disc 71. The surface of disc 71 which positions lowermost is provided with a generally wedge-shaped notch 73 the base of which positions co-planar with the base of the related channel 57. The side walls 74 of notch 73 diverge, similarly to the side walls 66, to provide the notch with an enlarged mouth which is positioned in line with and wider than the opening thereto from the inner end of the channel 57. The innermost central wall portion 77 of notch 73 is generally arcuate but it is not formed on a uniform radius. It is made slightly wider than the wall portion 64 and flatted at its central or apex portion 79 to expand the inner wall portion of this notch for reasons to be further described. Positioned so that the notch 73 provides an extension of the channel 57, the disc 71 is fixed in position by socket head screws 81. The latter are similar to the screws 67 but in this instance the two screws employed are not on a diametral line but offset, as seen in FIGS. 8, 9 and 10 of the drawings.

Attention is directed to the fact that the channels 55 and 57 are abruptly expanded by the notches which form their extensions. Moreover, the divergent side walls of the notches provide guide surfaces which lead gently into the innermost central wall portions thereof. In accordance with the invention, the discs 63 and 71 are formed of materials to provide that the wall surfaces of the notches are significantly harder than the material of which the plate 22' is formed.

As seen in FIG. 8 of the drawings, the dies applied to the system of the invention as here modified do not utilize the plate 35. In this instance, the punch holder 27 thereof is provided in its upper surface with a pair of tranversely spaced hardened pins 75. The pins 75 are arranged to position in a line adjacent, spaced from, and parallel to that which is defined by the forward edge of the punch holder 27 with reference to the related thrust plate. The respective positions of the pins 75 are such as to respectively align them with the channels 55 and 57. Note that the heads of the pins 75 are of a cylindrical form and are enlarged relative their body portions, the latter of which are cylindrically formed and sized to be fixed by a press fit in complementary holes in the punch holder 27. Moreover, the heads of the pins 75, which seat to and project from the upper surface of the punch holder 27, are of a shape and width to be complementary to that of the channels 55 and 57. This enables that the heads of the pins may be slid in and be positively and accurately guided by the channel walls in movement thereof into the respective notches in the discs 63 and 71, as will be further described.

It will be observed in FIG. 8 of the drawings that the discs 63 and 71, by virtue of their notches or recesses 65 and 73, provide sockets for positioning the pins 75. In assembling a die using the adapter apparatus of the invention including the pin-socket arrangement just described, a user, having his press equipped with the "PRESSIZER" elements of the invention, places a preassembled die on the platen 18, sliding the same inwardly on the platen until it is supported thereby. This initial positioning of the die will be such that the pins 75 will be located immediately forward of the front edge of the thrust plate 22'. The press slide 11 is then lowered until the thrust plate 22' approaches contact with the punch holder 27. The plate 22' is lowered sufficiently that a sliding adjustment of the die set will bring the pins 75 to bear within the confines of the channels 55 and 57. The die is then simply maneuvered to slide the same inwardly on the platen 18 so as to have the heads of the pins 75 enter the channels 55 and 57 and be guided by the side walls thereof into the notches in the discs 63 and 71. As the pins move into the discs, the relatively wider, expanded, mouths of their notches insure that the pin movement is free and unrestricted. The one pin 75 which enters the disc 63 will be brought into a seated engagement in the socket provided by its notch 65 and centered in its abutment with its arcuate back wall portion 64. The other pin 75 is similarly caused to enter the notch 73 in the disc 71 and abut its rearmost wall portion 77. Attention is directed to the fact that the notch in the disc 63 provides a datum control socket. This means that the abutment of the pin to its innermost wall portion 64 provides a precise location therefor. By reason of the flat 79, provided in the expansion of the rear wall portion of the notch 73 in disc 71 the right hand pin 75, as shown in the drawings, is accommodated, irrespective of a tolerable discrepancy as to its spacing or position, so as to permit the die to be precisely positioned referenced to both the platen 18 and the thrust plate. With the die thus accurately and quickly set as to its "X" and "Y" axes, the punch holder 27 is fixed to the thrust plate 22' by use of suitable means, with the pins 75 positioned in their sockets as required for a precise positioning of the die. Of course, the die holder 26 is similarly fixed to the platen 18.

In this last described assembly process, by a slip fit of the pins 75 into their respective sockets the die set is aligned correctly, in a side to side direction as well as from front to rear of the thrust plate and the platen. Moreover, the die is easily and quickly aligned in a radial or rotary sense as referenced to the pin in the datum socket.

As may be seen, a simple and effective means is provided whereby a die may, by a simple horizontal sliding action to fixed stops, be precisely oriented and the parts thereof fixed to receive and act upon the materials to be worked. Basically, the pins 75 are arranged for a positive location and squaring of the die with the press and in reference to its feed provision. The ease with which the pin-socket arrangement provides for guiding the die set into correct position, centered and square with the press, without any force or requirements for measurement is most significant as far as providing advantages in the application and interchange as well as a standardization of dies. This modification of the invention which is preferred enables the use of one thrust or adapter plate to receive all standard die sizes for a press. This adaptability of a press as provided by the invention adds to its ability to provide a simple and quick change of the platen required to give a support appropriate for the size of die employed. In total the noted features contribute to substantial advance in the art, eliminating the need for much custom adaptation in the manufacture and application and interchange of dies in a press. Attention is directed to the fact that the system avoids the need for removal of a thrust or adapter plate in the interchange of dies. Moreover, the application of the improvements just described produce no conflict or interference with the maximum tooling area which is provided in a die set in accordance with the invention.

FIG. 12 shows a modification of the head of the right hand pin 75 associated with the disc 71. This modification can contribute to accommodating a fine rotary adjustment of a die set referenced to the datum control socket 65. The head of this modified pin is identified by the numeral 75' and its periphery includes portions 83 and 84 which are formed on the same radius, a relatively flatted portion 82 and a portion 85 formed on a larger radius. It will be seen that, by rotating the head of the pin 75', a selective portion of its periphery will in seating of the pin abut the rear wall portions 77, 79 of the socket 73 and selectively change the position of the die referenced to the datum socket pin 75. This will provide for limited correction of the position of the die in a rotary sense, if such proves to be required.

It is of importance to note that the pin-socket arrangement for mounting a die removes the requirement for highly critical dimensioning in the means for fitting the die in place.

As will be seen, the pin-socket arrangements of FIGS. 8 through 12 provide important improvements in means for quickly and precisely mounting a die to a backing structure. It will be obvious therefrom, moreover, that the pin-socket arrangement could have similar significance in mounting any tool holder or similar assembly to a reference surface for accurate alignment with work or other tool elements. Such is well within the comprehension of the present invention and is here claimed.

Another modification of embodiments of the invention involves a use of die handlers, useful in positioning the die, as sling anchors and as spacer devices. The die handlers are in the illustrated instance mounted on three sides of the die. Each includes a handle 38 anchored at one end to the side of the die holder 26 by a screw 39. The other end carries a screw 40 engageable alternatively in a tapped hole 41 in the holder 26 and in a hole 42 in the holder 27. Engagement of the handle screw 40 in hole 41 or hole 42 is a releasable one. It may at will be disengaged from one hole position and reengaged in another, the handle 38 being in the process swung some 90° between alternate positions of adjustment. Engaged in hole position 41, the devices 38 are in stored position against the fixed die half 26 during operation, the die having been previously aligned and locked to the thrust plate 22 and platen 18 by devices 38. Engaged in hole position 42, the devices 38 serve as handles to assist in the maneuvering and positioning of the die set. Also engaged in hole position 42, the devices 38 act as spacers, holding the die set in an open position with tooling elements out of engagement with die components, obviating damage. Also, as attached in hole position 42 the device 38 provided anchor locations simplifying the formation of a sling whereby flexible cables 50 or the like may be attached to the die set and in turn connected with power lift mechanism for moving a die into and out of storage and into and out of position in a press. The handle devices 38 are rigid members which when interconnecting the holder elements form positive links maintaining a spaced relationship of the punch and die holders. Through use of the devices 38 a die may be preassabled, stored and in unitary fashion installed in or substituted in a press. In the illustrated instance handlers 38 are adapted to hold the die in an open position. The length of the handle devices could, if desired, be made such as to maintain in the alternative a closed position of the die.

The die may have a temporary attachment to skid members 43 and 44 which protect the die in storage and permit its more facile handling by forklift or like material handling devices. The skid members may conveniently be attached to the die holder 26, using handler holes 41.

The die is attached on the one hand to the thrust plate 22 or 22' and on the other hand to the platen 18 by screws. The pattern of screw holes is standardized and coordinated with die sizes to permit dies to be mounted in presses of compatible size and capacity and to discourage their use in presses which are outside the acceptable range, for example, small dies used in overly large presses. In the case of the platen 18, die size and platen size are coordinated to assure proper support for the die holder and to assure that sufficient dropthrough opening for slug disposal will be provided without likelihood of misoperation from improper disposal.

While in one aspect of the invention the "Pressizer" components equip a press for use with any conventional die, the invention also contemplates a use of standardized dies and accessories. A platen 18 will have particular reference to a certain one or to a certain series of dies and its pattern of holes 21 will be in a compatible or conforming relation to an attachment hole pattern in the die holder of the certain die or series of dies.

The preferred pin-socket arrangement, or "Centerizer" plate 35 in certain applications, will provide initial guidance in fitting the die to the thrust plate and then positively positions the die in the press. As far as the pin-socket arrangement, this will universally produce a precise positioning and enables a precise lock of a die in place. In use of plate 35, lateral bearing areas of the plate prevent turning of the die during operation and thereby maintain a positive position thereof parallel with the feed line direction of the stock or work piece. In any case, dies can be interchanged within the press without readjustment of feed line height or direction.

The principle of parallelism exists also in the base portion of the "Pressizer" equipped press where the platen 18 has a closely controlled slip fit mounting between parallel bolster shoulders 14 and 15. Dimensions throughout the die and adapter assembly are taken from appropriate centers. Shoulder 14 and 15 provide, as noted, a slideway for introduction and removal of the platen and control the platen in a lateral sense for installation of the screws 45 into appropriate tapped holes 46 which fix it in position onto plate 13. Automatically positioning the platen in a fore and aft or front to rear sense is a locating mechanism which may take the form of a ball 47 accommodate in a recess 48 in plate 13 and spring urged outwardly to engage in a detenting recess 49 in the platen 18. Proper positioning of a platen 18 accordingly is a simple, substantially automatic operation. As it is slip fit into position, shoulders 14 and 15 align it correctly in lateral and angular senses while engagement of the ball 47 in detent 49 signals arrival of the platen in a correct position in a fore and aft sense. So accurately located, the platen is in a directly opposing relation to the thrust plate 22, insuring precision alignment of the fixed and acting halves of the die. The screw connections of the die to the platen 18 and to the thrust plate 22 may exhibit a slight tolerance as may be required for conformance to the positively located platen and the positively engaged pins 75 or plate 35 as the embodiment may provide.

The plate 35 has been disclosed as mounted on the die and the mating slot 24 as formed in the thrust plate 22. Also pins 75 have been illustrated on the punch holder and sockets in the thrust or adapter plate. It will be evident that this relationship could, if desired, be reversed.

Note the invention simply allows adjustments to bolster thickness which adapt a press or like apparatus to attain a standard open area between the press slide and bed in a closed position, thereby gaining the advantage (economics) and benefit of standardized working height of all dies as contemplated in the system.

As contemplated by the invention, patterns of attachment holes in thrust plates are inclusive of all die sizes coordinated to the series for that press size and match with attachment holes in the replaceable platens; i.e. — each platen coordinates to one standard die size but the thrust plate will accept the punch holder of all dies in series.

The embodiments of the invention in which an exclusive property or priviledge is claimed are defined as follows:

1. Apparatus for simple and precise positioning of a tool holder or like plate assembly relative to a surface providing therefor a base support characterized by said plate assembly and its base support having in connection therewith means for a slip fit of one to the other, said means including a plurality of cooperating spaced means respectively on said plate assembly and said base support arranged for a sliding interfit, said interfitting means including portions providing on contact a precise datum control for the location of said plate assembly and other portions of said interfitting means providing means to accommodate discrepancies in the relative positions thereof in reference to said datum control so as to provide for a simple and automatic positioning of said plate assembly on said base support on slip fit of said interfitting means.

2. Apparatus for simple and precise positioning of a tool holder or like assembly relative to a backing structure characterized by said assembly and its backing structue having in connection therewith means for a sliding interfit of one to the other, said interfitting means including portions which provide, on contact, a precise datum control point for a referenced positioning of one of said assembly or its backing structure relative the other, and other portions formed to accommodate discrepancies in the prescribed positions thereof relative said datum control point so arranged to provide for a simple and automatic positioning of said assembly on said backing structure on a slip fit of one to the other.

3. Apparatus as in claim 2 wherein one of said assembly or said backing structure includes laterally spaced pin-like projections and the other thereof includes means defining guide channels opening laterally thereof and formed to receive said pin-like projections by a slip fit thereof, one to the other, and means providing a wall structure forming a terminal abutments surface for the pin in each said channel, and the wall structure forming the abutment surface for one of said pins being formed to precisely locate said one pin and the wall structure defining the abutment surface for another of the said pin being formed to accommodate tolerable discrepancies in the lateral spacing of the pins from that precisely desired.

4. Apparatus as in claim 1 characterized by said interfitting means including means defining guide channels terminating in socket means opening laterally to and forming extensions of said guide channels and pin-like projections which are slidably received in said guide channels to seat in said socket means and thereby position said plate assembly relative to said base support.

5. Apparatus as set forth in claim 4 characterized by said socket means being provided by releasable and replaceable inserts.

6. Apparatus as set forth in claim 5 characterized by said inserts having notches therein which are wedge-like in configuration and arranged so the maximum dimension of each said notch is positioned to open to the related guide channel.

7. Apparatus as in claim 6 characterized by said notches being differentially shaped at the convergent ends thereof which form abutments for the pin-like projections on the occasion of a sliding interfit of said plate assembly to its base support.

8. Apparatus as set forth in claim 3 characterized by one of said pin-like projections having an irregular peripheral contour and being rotatably adjustable to control the orientation of said assembly referenced to its backing structure in a rotative sense, as referenced to said datum control point.

9. Apparatus as set forth in claim 2 characterized by one of said backing structure and said holder assembly including spaced guide channels in a surface thereof arranged to abut the other in a relative interfit thereof, said guide channels opening to recesses in said surface which form extensions of said guide channels and said recessses embodying inserts, portions of which are cut out to form extensions of said guide channels and the other of said backing structure and holder assembly including means defining projections slidably received in and interfitting with said means defining said guide channels.

10. Apparatus as in claim 9 characterized by said cut-out portions of said inserts being wedge-like in configuration and forming in one instance, at the apex of the wedge-like configuration thereof, a surface to confine an abutted one of said projection to define thereby said datum control point and the other of said inserts having a cut out configuration which accommodates another of said projections and discrepancies within prescribed tolerances, in the positoning thereof relative to the confined one of said projections, in both X and Y directions.

11. Apparatus as in claim 10 characterized by said other of said projections being rotatably adjustable and formed to provide for a variable rotative position of said holder assembly relative its backing structure.

* * * * *

UNITED STATES PATENT AND TRADEMARK OFFICE
CERTIFICATE OF CORRECTION

PATENT NO. : 3,908,500
DATED : September 30, 1975
INVENTOR(S) : Robert J. Gargrave; Ludomil A. Holiga It is certified that error appears in the above-identified patent and that said Letters Patent are hereby corrected as shown below:

Col. 1, line 26, -- of -- is inserted following "half".

Col. 2, line 16, "the" (second occurrence) is corrected to read -- The --.

Col. 3, line 7, "is" is corrected to read -- as --.

Col. 5, line 14, "inter-vening" is corrected to read -- intervening --.

Col. 6, line 13, "many" is corrected to read -- may --.

Col. 6, line 46, "any" is corrected to read -- may --.

Col. 7, line 54, "numerals" is corrected to read -- numeral --.

Col. 11, line 4, "device" is corrected to read -- devices --.

Col. 11, line 4, "provided" is corrected to read -- provide --.

Col. 11, line 13, "preassa-" is corrected to read -- preasser -

Col. 11, line 65, "Shoulder" is corrected to read -- Shoulders --.

UNITED STATES PATENT AND TRADEMARK OFFICE
CERTIFICATE OF CORRECTION

PATENT NO. : 3,908,500
DATED : September 30, 1975
INVENTOR(S) : Robert J. Hargrave; Ludomil A. Foliga It is certified that error appears in the above-identified patent and that said Letters Patent are hereby corrected as shown below:

Col. 12, line 5, "accommocate" is corrected to read
-- accommodated --.

Col. 12, line 41, "priviledge" is corrected to read
-- privilege --.

Col. 12, line 62, "structus" is corrected to read
-- structure --.

Col. 13, line 12, "abutments" is corrected to read
-- abutment --.

Col. 13, line 17, "pin" is corrected to read -- pins --.

Col. 14, line 26, "projection" is corrected to read
-- projections --.

Col. 14, line 30, "positoning" is corrected to read
-- positioning --.

Signed and Sealed this twenty-third Day of March 1976

[SEAL]

Attest:

RUTH C. MASON
*Attesting Officer*

C. MARSHALL DANN
*Commissioner of Patents and Trademarks*